United States Patent [19]

Tenhagen

[11] 4,304,872

[45] * Dec. 8, 1981

[54] FLEXIBLE POLYURETHANE FOAMS HAVING SUBSTANTIAL NUMBER OF CELLS WITH INTERNAL RESIDUAL CELL SURFACE OF 60 TO 90 PERCENT

[75] Inventor: Rudolf J. Tenhagen, Longirod, Switzerland

[73] Assignee: BP Chemicals Limited, London, England

[ * ] Notice: The portion of the term of this patent subsequent to Jun. 30, 1998, has been disclaimed.

[21] Appl. No.: 143,415

[22] Filed: Apr. 24, 1980

[30] Foreign Application Priority Data

Apr. 28, 1979 [GB] United Kingdom ............... 14846/79

[51] Int. Cl.$^3$ ............................................. C08G 18/14
[52] U.S. Cl. ..................... 521/52; 521/112; 521/117; 521/137; 521/904; 521/918
[58] Field of Search ................. 521/52, 112, 117, 137, 521/904, 918

[56] References Cited

U.S. PATENT DOCUMENTS

| | | | |
|---|---|---|---|
| Re. 27,541 | 1/1973 | Morehouse | 521/174 |
| 3,505,377 | 4/1970 | Morehouse | 521/174 |
| 3,741,917 | 6/1973 | Morehouse | 521/112 |
| 3,839,384 | 10/1974 | Morehouse | 521/110 |
| 3,887,483 | 6/1975 | Morehouse | 521/112 |
| 4,016,163 | 4/1977 | Kanner et al. | 521/112 |
| 4,031,044 | 6/1977 | Joslyn | 521/112 |
| 4,039,490 | 8/1977 | Kanner | 521/110 |
| 4,067,828 | 1/1978 | Kanner et al. | 521/112 |
| 4,071,483 | 1/1978 | Litteral et al. | 521/112 |
| 4,119,582 | 10/1978 | Matsubara et al. | 521/112 |
| 4,150,048 | 4/1979 | Schilling et al. | 521/112 |

FOREIGN PATENT DOCUMENTS

| | | |
|---|---|---|
| 2519004 | 11/1976 | Fed. Rep. of Germany . |
| 2316272 | 1/1977 | France . |
| 2316273 | 1/1977 | France . |
| 2316274 | 1/1977 | France . |
| 1515956 | 6/1978 | United Kingdom . |
| 1515957 | 6/1978 | United Kingdom . |

*Primary Examiner*—Maurice J. Welsh
*Attorney, Agent, or Firm*—Brooks, Haidt, Haffner & Delahunty

[57] ABSTRACT

A novel flexible polyurethane foam has a substantial number of cells with an internal residual cell surface greater than 60% and less than 90%. The novel foams have improved vibration damping characteristics.

7 Claims, 6 Drawing Figures

FLEXIBLE POLYURETHANE FOAMS HAVING SUBSTANTIAL NUMBER OF CELLS WITH INTERNAL RESIDUAL CELL SURFACE OF 60 TO 90 PERCENT

The present invention relates to a process for the production of flexible polyurethane moulded foams. For comfortable transportation of seated passengers in cars, buses, trains, aeroplanes etc. a seat construction made out of springs, rubberised hair, converted conventional foam, moulded conventional or high resilient polyurethane foams, foam composite etc. is used to provide comfort in seats and backs by supporting the passenger's body, at the same time damping vibrations of different amplitudes and frequencies which exist on the seat base, caused by the movement of the car, train, bus, aeroplane etc. Depending on the type and construction of the transporter different vibrations exist which have to be controlled for comfort reasons.

It is known that flexible polyurethane foams as such have basically a good vibration damping characteristic, which is better than compositions made out of metal springs with different topper pads.

Therefore an increasing number of seats for cars, trains, aeroplanes, buses etc. are made out of urethane foams, either cut and shaped from slab-stock buns or directly moulded using the hot moulding or one shot cold cure technique. These moulded parts are used alone or on flat springs, or other flexible supports such as rubber strings. With this relatively new technique it was possible to improve the seating comfort in movable vehicles obtaining at the same time savings on total seat costs, through easier and faster assembling.

A problem which is sometimes found with the known polyurethane foams used as seats in cars, buses and other means of transport is that if a load, for example a person, supported by the foam is subjected to vibrations at certain frequencies the amplitude of the movement by the load in response to the applied vibration increases due to reinforcement by successive vibrations until undesirably high levels are reached.

When polyurethane foams are produced, bubbles of gas are formed in a liquid reaction mixture. As the foaming reaction proceeds the bubbles of gas expand and the liquid reaction mixture cures to a solid. This produces a membrane between adjoining bubbles. The thickness of this membrane varies and is of course thinnest where the expanding bubbles are in contact with one another. Depending on the relative rates of the blowing reaction and the curing reaction the resulting foam membrane will either break at the point of contact between the bubbles so that the bubbles become open cell foams, or the membranes will remain intact and give a closed cell foam. Techniques for controlling the foaming reaction so as to give open or closed cells are well known to those skilled in the art.

The different known methods of producing flexible polyurethane foams produce foams with different physical properties and different physical structure. Thus when foams are made by the hot moulded process in which foaming takes place inside a heated mould very fine, uniform open cells are produced in the foam as taken from the mould. In contrast the cold cure process for producing flexible foam is operated so as to produce a product having a substantial proportion of closed cells in the foam as taken from the mould. The foam is subjected to a crushing step to break the membranes between the cells giving an open cell foam as a final product. The cold cured foams generally have a less regular cell structure than the hot moulded foams. Hot moulded foams generally have better vibration damping characteristics than cold moulded foams particularly when compared with the so-called "high resilience" foams, but are generally inferior in "breathability" as measured by the NOPCO air flow test and have a greater tendency to sag when subjected to repeated loads.

It would be desirable to have a polyurethane foam which had the desirable properties of the known cold cure foams but which had improved ability to damp vibrations.

According to the present invention a flexible polyurethane foam has a substantial number of cells with an internal residual cell surface greater than 60% and less than 90%.

The internal surface area of a cell is the area of the solid internal surfaces of the cell as a percentage of the area it would have if all the openings in the cell were closed off by a membrane.

It is preferred that at least 50% of the cells have an internal residual cell surface greater than 60% and less than 90% and it is particularly preferred that substantially all of the cells have an internal residual cell surface in this range.

Depending on the physical properties required in the foams it may be preferred that substantially all the cells have internal residual cell surfaces in the range 60% to 70%, 65% to 75% or 70% to 90%.

The vibration control or amplification quotient, $Q_x$, is preferably not greater than 3.5, more preferably not greater than 3.2, most preferably not greater than 2.6.

The polyurethane foam according to the present invention is preferably a high resilience foam. High resilience foams are foams having a resiliency of about 55% to about 70% as measured by ASTMS D-3574-77. Such foams and methods for their production are well known to those skilled in the art. High resilience foams have properties which make them useful for seating in the transport industry. The improved vibration damping which can be obtained using the foams of the present invention is particularly useful when the foam is a high resilience foam.

The foams of the present invention preferably have a breathability as measured by the NOPCO test of not more than 2, more preferably not more than 1.0 SCFM. The foams preferably have a surface breathability as measured by the Gurley test of not less than 2 more preferably not less than 2.5 sec. The surface breathability is preferably not greater than 20, more preferably not greater than 10 sec.

The foam preferably has a hardness as measured by the IFD ASTM test of at least 100 more preferably greater than 200 N. It is particularly preferred for the foam to have a hardness of at least 300 N.

The cell size distribution and the internal residual cell surface are determined from observations of foam under the microscope.

A process for producing the novel foams of the present invention is disclosed in our copending application Ser. No. 141,559 filed April 18, 1980.

This copending application is directed to a process for the production of a cold cure moulded polyurethane flexible foam by reaction of a polyol with a polyisocyanate and foaming in the presence of a blowing agent followed by crushing of the moulded foam to open the foam cells which is characterised in that foaming takes place in the presence of a mixture of (1) a high molecular weight linear siloxane polyoxyalkylene block copolymer of formula $(AB)_n$ type wherein n is an integer and A is a siloxane block and B is a polyoxyalkylene block and (2) a solvent which is compatible with the high molecular weight linear siloxane polyoxyalkylene block copolymer and which has a viscosity of 3 to 1000 cps, and a surface tension between 15 and 60 dynes/cm.

The process of application is characterised by the use of a mixture of high molecular weight predominantly linear siloxane polyoxyalkylene block copolymer of formula $(AB)_n$ and a solvent which is compatible with the high molecular weight predominantly linear block copolymer and which has the characteristics defined above.

The use of the mixture gives useful improvements in foam properties compared with the results obtained with otherwise similar foaming processes in which the mixture is not used. The use of the mixture is particularly valuable, however, in that it is a method of producing the novel foams of the present invention.

THE COLD CURED MOULDING PROCESS

Processes for the production of cold cured moulded polyurethane foams in which a polyol and an isocyanate are reacted together in closed moulds in the presence of a blowing agent are well known to those skilled in the art and are to be distinguished from the processes using open conveyors by which slabstock buns are produced. The process of the present invention may be applied to any of the conventional processes for the production of cold cured flexible moulded polyurethane foam. The pre-polymer technique can be used in which the polyol is reacted with an excess of polyisocyanate to give a prepolymer which is foamed in a second step by the action of a blowing agent, usually water. Alternatively the one shot technique may be used in which reaction of the polyol and isocyanate and the foaming reaction take place in a single step.

THE POLYOL

In producing cellular urethane polymers in accordance with the teachings of this invention, the reaction mixture or foam formulation contains an active hydrogen-containing organic compound having an average of at least two and usually not more than five active hydrogen atoms present as hydroxyl groups. Such organic polyol reactants include compounds consisting of carbon, hydrogen and oxygen as well as compounds which contain these elements in combination with phosphorus, halogen and/or nitrogen. Suitable classes of organic polyol reactants for use in the method of this invention are polyether polyols, polyester polyols, polylactone polyols, nitrogen-containing polyols, phosphorus-containing polyols, phenolic-based polyols, and polymer/polyols produced by polymerising an ethylenically unsaturated monomer in one of the aforesaid polyols in the presence of a free radical initiator, or reacting isocyanates with primary and/or secondary amino groups containing polyamines and/or hydrazines in presence of above mentioned polyols, as described in the German Offenlegungsschrift No. 25 19 004 (4.11.76).

It is well known to the polyurethane art that the particular polyol reactant or combination of polyols employed depends upon the end-use of the polyurethane product.

For this purpose the polyol is usually chracterised by its hydroxyl number which is determined by and defined as the number of milligrams potassium hydroxide required for the complete neutralisation of the hydrolysis product prepared from 1 g of polyol or mixture of polyols. The hydroxyl number is also defined by the following equation which relfects its relationship with the functionality and molecular weight of the polyol.

$$OH = (56.1 \times 1000 \times f./M.W.)$$

wherein
OH = hydroxyl number of polyol
f = average functionality, that is, average number of hydroxyl groups per molecule of polyol
M.W. = average molecular weight of the polyol The above described polyols are used with advantage in the manufacture of high resilience foam manufacture.

Such foams usually have a resiliency of from about 55 to about 70 percent, as measured by standard test procedure ASTM D-3574-77. In accordance with a preferred embodiment of this aspect of the present invention, high-resilience foam formulations are used wherein at least 40 weight percent of the total polyol content is constituted of a polyether triol having the following additional characteristics: (a) an average primary hydroxyl content of at least 40 mole percent (or no more than 60 percent of the less reactive secondary hydroxyl groups); and (b) an average molecular weight of from about 2000 to about 8000. Preferably, such polyether triols for use as components of high-resilience formulations contain from about 60 to about 90 mole percent of primary hydroxyl groups and have an average molecular weight of from about 4000 to about 7000. Consistent with their trifunctionality and the aforesaid respective ranges of molecular weights, such polyether triols have hydroxyl numbers from 84 to 21, preferably from 42 to 24. These highly reactive polyether triols are provided by oxyalkylation of one of the aforesaid trihydric starters such as glycerol, with propylene oxide and ethylene oxide. Usually, the total ethylene oxide content of the polyether triols is between about 7 and about 20 weight percent, expressed on the basis of total alkylene oxide fed during the oxyalkylation reaction. The high primary hydroxyl content is introduced by capping of the polyoxyalkylene chains with at least a portion of the total ethylene oxide feed.

In providing high resilience foams, the polyether triols may be used as essentially the sole type of polyol in the formulation or they may be employed in combination with other polyols to control the degree of softness or firmness of the foam to vary the load bearing properties.

THE ISOCYANATE

The polyisocyanate components employed in this invention for mixing with active hydrogen compounds preferably are those having the general formula:

$$Q(NCO)_i$$

wherein i is an integer of two or more and Q is an organic radical having the valence of i. Q can be a substituted or unsubstituted hydrocarbon group (e.g. an alkylene or an arylene group). Q can be a group having the formula Q'—Z—Q' where Q' is an alkylene or arylene group and Z is —O—, —O—Q'—, —CO—. —S—, —S—Q'—S—, or —SO$_2$—. Examples of such compounds include hexamethylene diisocyanate, 1,8-diisocyanato-p-menthane, xylene diisocyanate, (OCNCH$_2$CH$_2$OCH$_2$)$_2$O, 1-methyl-2.4-diisocyanatocyclohexane, phenylene diisocyanates, tolylene diisocyanates, chlorophenylene diisocyanates, diphenylmethane-4.4'-diisocyanate, naphthalene-1.5-diisocyanate, triphenylmethane-4.4',4"-triisocyanate, and isopropylbenzene-alpha-4-diisocyanate.

Q can also represent a polyurethane radical having a valence of i in which case Q(NCO)$_i$ is a composition conventionally known as a pre-polymer. Such pre-polymers are formed by reacting a stoichiometric excess of a polyisocyanate as set forth hereinbefore and hereinafter with an active hydrogen-containing component as set forth hereinafter, especially the polyhydroxyl containing materials or polyols.

Further included among the isocyanates useful in this invention are dimers and trimers of isocyanates and diisocyanates and polymeric diisocyanates such as those having the general formula:

$$[Q''(NCO)_i]_j$$

in which i and j are each integers of two or more, and Q" is a polyfunctional organic radical, and/or, as additional components in the mixtures, compounds of the general formula:

$$L(NCO)_i$$

in which i is one or more and L is a monofunctional or polyfunctional atom or radical. Examples of this type include ethylphosphonic diisocyanate, C$_2$H$_5$P(O)-N-(NCO)$_2$; isocyanates derived from sulfonamides (QSO$_2$NCO), cyanic acid, and thiocyanic acid.

More specifically, the polyisocyanate component employed in this invention also include the following specific compounds as well as mixtures of two or more of them; 2,4-tolylene diisocyanate, 2,6-tolylene diisocyanate, crude tolylene diisocyanate, bis(4-isocyanatophenyl) methane, polyphenylmethylene polyisocyanates that are produced by phosgenation of aniline formaldehyde condensation products, dianisidine diisocyanate, toluidine diisocyanate, xylylene diisocyanate, bis(2-isocyanatoethyl) fumarate, bis(2-isocyanatoethyl) carbonate, 1,6-hexamethylene-diisocyanate, 1,4-tetramethylene-diisocyanate, 1,10-decamethylene-diisocyanate, cumene-2,4-diisocyanate, 4-methoxy-1,3-phenylene-diisocyanate, 4-chloro-1,3-phenylenediisocyanate, 4-bromo-1,3-phenylenediisocyanate, 2-ethoxy-1,3-phenylenediisocyanate, 2,4'-diisocyanatodiphenylether, 5,6 dimethyl-1,3-phenylenediisocyanate, 2,4-dimethyl-1,3-phenylenediisocyanate, 4,4'-diisocyanatodiphenylether, bis 5,6-(2-isocyanatoethyl)(bicyclo 2.2.1)hept-2-ene, benzidenediisocyanate, 4,6-dimethyl-1,3 phenylene 9.10-anthracenediisocyanate, 4,4'-diisocyanatodibenzyl, 3,3-dimethyl-4.4'-diisocyanatodiphenylmethane, 2,6-dimethyl-4,4'-diisocyanatodiphenyl, 2,4-diisocyanatostilbene, 3,3'-dimethyl-4,4'-diisocyanatodiphenyl, 3,3'-dimethoxy-4,4'-diisocyanatodiphenyl, 1,4-anthracene diisocyanate, 2,5-fluorenediisocyanate, 1,8-naphthalene diisocyanate, 2,6-diisocyanatobenzfuran, 2,4,6-toluene diisocyanate, and many other organic polyisocyanates that are known in the art, such as those that are disclosed in an article by Siefken, Ann. 562, 75 (1949).

CROSS-LINKING AGENTS

Further modifications are possible by adding cross-linking agents from 0.2 to 20 pphp preferable 0.5 to 8 pphp to vary hardness density ratios and/or improve specific physical properties. Cross-linking agents are two and or higher functional primary and/or secondary amines and/or polyalcohols having molecular weights from 60 to 2000 molecular preferable 80 to 400.

The following cross-linking agents can be used: aliphatic, araliphatic, cycloaliphatic and aromatic amines, such as ethylenediamine, 1.2- and 1.3-propylene diamine, tetramethylenediamine, hexamethylenediamine, dodecamethylenediamine, trimethyldiaminohexane, N,N'-dimethylethylenediamine, 2,2'-bisaminopropyl melamine also higher homologs of ethylenediamine like diethylenetriamine, triethylenetetramine and tetraethylenepentamine, homologs of propylenediamines like dipropylenetriamines, piperazine, N,N'-bisaminoethyl-piperazine, triazine, 4-aminobenzylamine, 4-aminophenyl ethylamine, 1-amino-3.3.5-trimethyl-5-aminomethyl-cyclohexane, 4,4'-diaminodicyclohexyl-methane and -propane, 1.4-diaminecyclohexane, phenylendiamine, naphthylenediamine, condensates from aniline, formaldehyde, toluylenediamines, bis-aminomethylbenzole and other single or double monoalkylated aromatic amines.

Hydroxyl groups-containing cross-linking agents are: ethanediol, propanediol-1.2, butanediol 1.2, -1.3, -1.4, hexandiol, diethyleneglycol, triethyleneglycol, tetraethyleneglycol, dipropyleneglycol, tripropyleneglycol hydroquinone.

BLOWING AGENTS

Water and/or readily volatile organic substances are used as blowing agents in the process according to the invention.

Generally, the blowing agent is employed in an amount from about 1 to about 15 parts by weight per 100 parts by weight of total polyol reactant, the particular blowing agent and amount thereof depending upon the type of foam product desired. Flexible foam formulations usually contain no more than about 6 pphp of water. The selection and amount of blowing agent in any particular foam formulation is well within the skill of the cellular polyurethane art. Suitable organic blowing agents are e.g. acetone, ethyl acetate, halogenated alkanes, such as methylene chloride, chloroform, ethylidene chloride, vinylidene chloride, monofluorotrichloromethane, chlorofluoromethane or dichlorodifluoromethane, butane, hexane, heptane or diethyl ether. A blowing effect can also be obtained by adding compounds which decompose at temperatures above room temperature to liberate gases, e.g. azo compounds such as azoisobutyric acid nitrile which liberate nitrogen. Further examples of blowing agents and details of the use of blowing agents may be found in Kunstoff-Handbuch, Volume VII, published by Vieweg and Hoechtlen, Carl-Hanser-Verlag, Munich 1966 e.g. on pages 108 and 109, 453 and 507 to 510.

CATALYSTS

Catalysts are also frequently used in the process according to the invention. The catalysts used are known per se, e.g. tertiary amines such as triethylamine, tributylamine, N-methyl-morpholine, N-ethyl-morpholine-N-Cocomorpholine, N,N,N',N'-tetramethyl-ethylenediamine, 1,4-diaza-bicyclo-(2,2,2)-octane, N-methyl-N'-dimethyl-aminoethyl-piperazine, N,N-dimethyl benzylamine, bis-(N,N-diethylaminoethyl)-adipate, N,N-diethylbenzylamine, pentamethyl diethylenetriamine, N,N-dimethylcyclohexylamine, N,N,N',N'-dimethyl-phenylethylamine, 1.2-dimethyl imidazole and 2-methyl-imidazole, triethylene diamine, bis(2-dimethylamino ethyl) ether.

The tertiary amines which contain hydrogen atoms capable of reacting with isocyanate groups may be e.g. triethanolamine, triisopropanolamine, N-methyldiethanolamine, N-ethyldiethanolamine, N,N-dimethylethanolamine or their reactions products with alkylene oxides such as propylene oxide and/or ethylene oxide.

Silaamines which contain carbon-silicon bonds may also be used as catalysts, e.g. the compounds described in German patent specification No. 1 229 290 such as 2,2,4-trimethyl-2-silamorpholine or 1,3-diethylaminomethyl-tetramethyl-disiloxane.

The catalysts used may also be bases which contain nitrogen such as tetraalkyl ammonium hydroxides or alkali metal hydroxides such as sodium hydroxide, alkali metal phenolates such as sodium phenolate or alkali metal alcoholates such as sodium methylene. Hexahydrotriazines may also be used as catalysts.

Organic metal compounds may also be used as catalysts according to the invention, especially organic tin compounds.

The organic tin compounds used are preferably tin (II) salts of carboxylic acids such as tin (II)-acetate, tin (II) octoate, tin (II)-ethylhexoacte and tin (II)-laurate and the dialkyl tin salts of carboxylic acids such as dibutyl tin diacetate, dibutyl tin dilaurate, dibutyl tin maleate or dioctyl tin diacetate.

Other examples of catalysts which may be used for the process according to the invention and details of their mode of action are described in Kunststoff-Handbuch, Volume VII, published by Vieweg and Hoechtlen, Carl-Hanser-Verlag, Munich 1966, e.g. on pages 96 to 102.

The catalysts are generally used in a quantity of between 0.001 and 10% by weight, based on the quantity of compounds which contain at least two hydrogen atoms capable of reacting with isocyanates.

OPTIONAL CONVENTIONAL ORGANOSILOXANE SURFACTANT

In producing cellular polyurethanes in accordance with the method of this invention, a minor amount of an organosilicone surfactant may also be present as an additional component of the polyurethane-forming reaction mixture. When used such surfactants are usually present in amounts up to about 5 parts by weight per 100 parts by weight of total polyol reactant. Suitable classes of silicone surfactants are the polysiloxane-polyoxyalkylene block copolymers wherein the respective blocks are joined through silicon-to-carbon or silicon-to-oxygen-to-carbon bonds and the respective polyoxyalkylene blocks are bonded to different silicon atoms of the polysiloxane backbone to form a comb-like structure. Usually, the polysiloxane blocks are trialkylsiloxy end blocked. In addition to the siloxy units to which the pendant polyoxyalkylene chains are bonded, the polysiloxane backbone is formed of difunctional siloxy units wherein the respective two remaining valences of silicon are satisfied by bonds to organic radicals. Illustrative of such organic radicals are the hydrocarbyl groups having from 1 to 12 carbon atoms includeing alkyl, aryl, aralkyl, bicycloheptyl and halogen substituted derivatives of such groups. The polyoxyalkylene blocks are usually constituted of oxyethylene units, oxypropylene units or a combination of such units, and the polyoxyalkylene chains are hydroxyl-terminated or capped with a monovalent organic group such as alkyl, aryl, aralkyl, acyl, carbamyl and the like. Especially useful as stabilisers of flexible polyether-based polyurethane foams are the block copolymers described in U.S. Pat. No. 3,505,377 and U.S. Reissue Pat. No. 27,541. The copolymers of the latter patent contain from 40 to 200 dimethylsiloxy units as essentially the sole type of difunctional unit, and from 15 to 60 weight percent of the oxyalkylene content of the polyoxyalkylene blocks is constituted of oxyethylene.

The process of the present invention is preferably applied to the production of high resilience foams.

Because of the high reactivity of high-resilience foam formulations, the foams are generally self-stabilising and can be obtained without the use of stabilising agents. However, it is usually desirable to include a silicon surfactant as an additional component of such formulations in order to minimise the tendency of the foam to settle and to control cell uniformity. Particularly effective for this purpose are the relatively low molecular weight polyoxyalkylene-polysiloxane block copolymers described and claimed in U.S. Pat. No. 3,741,917. Especially suitable as components of high-resilience formulations are the block copolymers described therein having the formula:

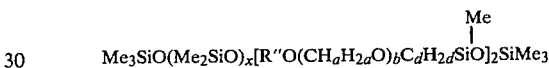

wherein x has the average value of from 2 to 7; be has a value from 3 to 10; z has an average value from 2 to 6; a and d each has a value from 2 to 4; and R" is a monovalent hydrocarbon radical such as alkyl, aralkyl and aryl radicals, or an acyl group.

Also suitable as organosilicone components of high-resilience foam formulations are the relatively low molecular weight aralkyl-modified polymethylsiloxane oils described and claimed in U.S. Pat. No. 3,839,384.

The organosilicone component is usually present in high-resilience formulations on an amount between about 0.025 and about 2 parts by weight per 100 parts by weight of total polyol.

ADDITIONAL INGREDIENTS

It is also sometimes desirable to include various additives in the reaction mixture such as colouring agents, fillers, flame retardants and the like. Suitable colouring agents are, for example carbon black, titanium dioxide, menthol blue, chromium red and the like. Suitable fillers are fatty acids including tall oil fatty acids, or tall oil per se, which, if desired, may be halogenated for example, with chlorine or bromine, vermiculite, saw dust, synthetic plastics including vinyl polymers such as, polyvinyl chloride, polystyrene and the like. Suitable flame retardants are antimony oxide, tris (chloroethyl) phosphate, tricresyl phosphate, triphenyl phosphate and the like.

THE NOVEL ADDITIVES

The Siloxane Block Copolymers

The high molecular weight predominantly linear siloxane polyoxyalkylene block copolymers used in the control of the vibration characteristics of the present invention are different from the polysiloxane polyoxyalkylene block copolymers conventionally used as foam stabilisers in chemically blown polyurethane foams.

They differ from the conventional foam stabilisers in being predominantly linear and in having a higher molecular weight. They are in general stronger surfactants than the foam stabilisers conventionally used in chemically blown moulded foams.

The high molecular weight siloxane polyoxyalkylene block copolymers are of formula $(AB)_n$ where n is an integer, A is a siloxane block and B is a polyoxyalkylene block. The copolymers are predominantly linear in that the chain of repeating units A and B is predominantly linear rather than predominantly branched. This does not however exclude the presence of branching in the individual repeating units A and B, particularly in the siloxane unit A.

The predominantly linear high molecular weight siloxane polyoxyalkylene block copolymers may be divided into two classes. 1. Hydrolysable block copolymers, i.e. those wherein the siloxane blocks and the polyoxyalkylene blocks are linked by silicon to oxygen to carbon linkages and/or by means of oxygen bondings. 2. Non-hydrolysable (hydrolytically stable) block copolymers, i.e. those wherein the siloxane blocks and polyalkylene blocks are linked by silicon to carbon linkages.

The preferred block copolymers are those of the hydrolysable type.

The average molecular weight of each siloxane block of the siloxane polyoxyalkylene or block copolymers is preferably in the range from about 500 to 10,000. The monovalent hydrocarbon radicals need not be identical throughout the siloxane block, but can differ from one siloxane unit to the next and can even be different within a single siloxane unit.

The predominantly linear polyoxyalkylene block copolymers can have an average molecular weight of about 20,000 to 250,000 or higher. Preferably the hydrolysable type $(AB)_n$ polymers have an average molecular weight of at least about 65,000 and most preferably about 100,000, while the non-hydrolysable type $(AB)_n$ polymers have an average molecular weight of at least 20,000. It is to be understood that the above molecular weight ranges apply to the high molecular $(AB)_n$ copolymers. When the high molecular weight $(AB)_n$ copolymers are employed in admixture with lower molecular weight materials resulting from the use of mono-ols in admixture with the diols, the average molecular weight of the total product may be lower than the values given above.

The high molecular weight predominantly linear siloxane polyoxyalkylene block copolymers are most preferably used in admixture with low molecular weight siloxane polyoxyalkylene condensation products obtained by reaction of polydialkyl siloxane with a mixture containing mono-ol in addition to the diol.

The high molecular weight predominantly linear siloxane polyoxyalkylene block copolymers may be made by the reaction of (1) a polydialkyl siloxane which has been end-blocked with alkoxy groups with (2) a polyoxyalkylene diol.

In order to prevent excessive branching of the block copolymer chain and to give a predominantly linear product it is highly desirable to react the end-blocked polydialkyl siloxane with a mixture of diol and mono-ol. The mono-ol is preferably a mono-ether of a polyoxyalkylene ether diol. The polyoxyalkylene diol from which the mono-ether is derived may be the same polyalkylene ether diol which is reacted with the polydialkyl siloxane or may be different.

The weight ratio of diol to mono-ol is preferably in the range 1:1 to 1:2.

The weight ratio of total diol and mono-ol to polyalkyl siloxzne may for example be in the range 7:1 to 1:1, preferably 5:1 to 2:1. The diol may, for example, have a molecular weight in the range 1500 to 7000, preferably not less than 2500, more preferably not less than 3000, and preferably not more than 6000, more preferably not more than 4000. It may be derived, for example, from ethylene oxide or propylene oxide or mixtures of these oxides.

The mono-ol may, for example, have a molecular weight in the range 500 to 2000, more preferably 800 to 1500, and may also be derived from ethylene oxide and/or propylene oxide units. In order to give the required mono-ol one of the terminal hydroxy groups of a polyalkylene ether diol may be end-blocked with an alkoxy group, e.g. methoxy or ethoxy.

The use of a mixture of diol and mono-ol gives a predominantly linear $(AB)_n$ block copolymer and serves to substitute partially active positions in the polydialkyl siloxane so preventing cross linking reactions and the formation of gel. Additionally it dilutes the high molecular weight $(AB)_n$ block copolymer with low molecular weight structures derived from the mono-ols (monofunctional polyethers). The reaction time is shortened, and the viscosity of the final product containing the $(AB)_n$ copolymer is reduced by the low molecular weight material, which facilitates the use of the product in the process of the invention.

The end-blocked polydialkyl siloxane with the diol is reacted may be produced by methods well known to those skilled in the art. The polydialkyl siloxane may be linear or branched, and may be derived from the equilibration product between cyclic dialkyl siloxane, e.g. cyclic dimethyl siloxane and trialkoxy alkyl silane, e.g. triethoxy methyl silane, or cyclic dialkyl siloxane and SiH fluid.

The resulting equilibrate is comprised of compounds of various functionality in the range 2 to 6. The backbone of the silicone unit is described by the average formula:

where x is an integer of at least 6, R is a monovalent hydrocarbon group and m is 0 or 1. When m is 1, the remaining valence of the Si atom is satisfied by H or by another siloxane group.

The backbone may be terminated by alkoxy groups or H.

Thus the active positions to be substituted by polyether are:

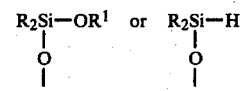

where $R^1$ is a hydrocarbyl group, e.g. alkyl and aralkyl groups. Examples of suitable alkyl groups are methyl, butyl and benzyl groups.

Note that in the above formula the backbone corresponds to the case when m is O in the formula $(-(R-)_{2-m}Si-O-)_x$ given above.

It is to be understood that while said $(AB)_n$ block copolymers used in this invention can be discrete chemical compounds they are usually mixtures of various discrete block copolymers species due at least in part to the fact that the siloxane and polyoxyalkylene reactants used to produce said $(AB)_n$ block copolymers are themselves usually mixtures. Moreover, while a single $(AB)_n$ block copolymer can be employed as foam cell modifier, mixtures of two or more different $(AB)_n$ block copolymers can also be employed if desired.

The quantity of the linear block copolymer added can vary over a moderately wide range. Examples of suitable quantities are those in the range 0.05 to 5%.

THE SOLVENT

Solvents which are used as diluents for the organic polysiloxane surfactant in this invention are compatible with the surfactant, and have a viscosity of 3 to 1000 cps preferably 10 to 500 cps. The solvent may, for example, have one to six reactive OH-group per molecule, but also neutral diluents which can be used. Solvents which cause a slight swelling effect on ready reacted polyurethane foam are preferred due to easier crushing if used in the production process of moulded polyurethane foams. The surface tension of the diluent is between 15 and 60 dynes/cm preferably between 30 and 40 dynes/cm. The viscosity is measured at 22° C.

Mixtures of surfactants and solvents such as alcohols, poly-alcohols polyesters, glycols, polyglycolethers, polyglycolesters, ethoxylated- and butoxylated- alcohols and glycols, aliphatic- and aromatic solvents in a ratio of from 1:99 to 99:1 by weight and every ratio in between allows the regulation of foam cell structure and openess of the cell membranes especially. Preferred weight ratios of the high molecular weight linear block copolymers to solvent are 2:100 to 10:100.

THE FOAMING STEP

The foaming step is carried out in a known manner in a closed mould. The foaming step can conveniently be carried out by feeding measured quantities of (1) the polyol, (2) isocyanate and (3) a mixture of the high molecular weight predominately linear siloxane polyalkylene block copolymer and solvent separately to a continuous mixer and is then poured into the mould. The cross-linking agents, blowing agents, catalysts, optional conventional organosiloxane surfactant and additional ingredients referred to above are conveniently fed to the moulding process in the polyol.

THE CRUSHING STEP

In the production of foam by the cold cured process it is necessary for processing reasons to carry out the foaming process so as to give a proportion of closed cells in the foam. The "cold cure" process in contrast to the hot moulded process does not use a highly heated mould but the reaction is exothermic and the foam is warm when removed from the mould. To avoid distortion of the foam it is necessary to crush the foam to open the cells. The crushing step is well known to those skilled in the art and the optimum crushing conditions for use in the present invention can be easily determined by simple tests.

The invention will now be illustrated by reference to the following Examples. In these Examples measurements were made of surface porosity and core breathability of the foam. Surface breathability was measured by the Gurley test using the Gurley-Hill S-P-S Tester. This equipment was originally developed to test the printing quality of paper. It measured smoothness, porosity and softness of the paper. As no test method exists to measure the surface porosity of moulded polyurethane foams, this equipment was used to evaluate the surface porosity. The Gurley-Hill S-P-S Tester measures a given air-leakage through the foam. Air, at a low uniform pressure, is supplied by an inverted cylinder, carefully standardised as to volume and weight, floating freely in an outer cylinder partly filled with oil. The air is forced downward, through an open tube, to the upper orifice plate against which the sample is clamped. Each 50 cc. is marked by rings on the inner cylinder from 0 to 300 cc. The test consists of timing the rings as they drop past the upper edge of the outer cylinder, using a stop watch or other timing device. Uniform clamping is provided by compressing the upper orifice plate 0.5 cm into the foam. The result is given as $$x \text{ sec}/300 \text{ cm}^3$$

The core breathability corresponds to the Air Flow as measured in accordance with ASTMS D 3574-77 and was determined using the well known Nopco apparatus.

All tests were carried out under ambient conditions. Approximately 50 to 60% relative humidity and 20° to 25° C.

The test specimen was either a square foam sample of a size of 40×40×10 cm or a complete seat.

DETERMINATION OF AMPLITUDE ENLARGEMENT FACTOR

This test was carried out with a plate which is connected to an eccentric. Different amplitudes and speeds (frequencies) can be simulated with the plate.

Amplitudes used in these tests are between 6 and 12 mm, at frequencies of 1 to 15 Hz.

On top of the plate, the foam sample (seat) to be tested is placed with a "Dummy" or weight which represents a seated person.

The enlargement factor can be calculated as follows:

$$Q_x = (x_r \text{ (mm)}/x_i \text{ (mm)})$$

$Q_x$ = amplification quotient
$x_r$ = resonance amplitude
$x_i$ = initial amplitude The results are given as a resonance maximum $Q_x$ at a certain frequency.

PREPARATION OF HIGH MOLECULAR WEIGHT SURFACTANTS

Example A

This example illustrates the production of a high molecular weight hydrolysable siloxanepolyoxyalkylene block copolymer derived from ethoxy blocked polydimethyl siloxane (EBDMS) and a blend of mono and dihydroxy polyethers.

In a two-liter flask equipped with fractionating column, thermometer, stirrer and a nitrogen inlet tube for sparging there was placed 133.2 g of dihydroxy polyether having an average molecular weight of 3100 and being composed from ethylene oxide (EO) and propylene oxide (PO) units in wt. ratio 50:50, 189 g of monohydroxy polyether of an average mol. wt. 1097 and EO/PO=50/50, 58 g of EBDMS having an average functionality 3 and containing 8% by wt. of terminal ethoxy groups, 0.33 g dry potassium acetate and 380 g of fresh toluene.

The mixture was heated and 0.43 ml of the trifluoroactic acid was added when the temperature reached 60° C. The temperature of the reaction mixture was set at 114° C. The azeotropic mixture of boiling point 75.5° C. appears in a short time in the still head. Having fixed the dropping rate of condensate the reflux ratio was set as 1/40 and the collection of distillate was started. The temperature rose to 108.5° C. and then 118 g of EBDMS in 114 g of toluene was admitted. The collection of newly formed azeotrope was pursued until 108.5° C. At that moment 6 ml of dicyclohexylamine was added and the mixture subjected to the stripping of toluene. The removal of toluene was accomplished by means of heating and rigorous nitrogen sparge.

Example B

A hydrolysable block polymer was prepared in the equipment described in the former example.

58 g of the silicone fluid (EBDMS) as in the former example was loaded together with 63 g of monohydroxy polyether of an av. M.W. 1097 and 50 g of polymer polyol (diol), containing 20% of styrene/acrylonitrile copolymer and having an av. M.W. 3500. 171 g of fresh toluene and 0.24 g of $CH_3COOK$ were added as well. The mixture was heated and the catalyst $F_3CCOOH$ admitted at 60° C. The flask temperature was set at 114° C. The azeotrope was collected until the temperature in the still head reached 108° C. 2 g of dicyclohexylamine was then added in order to neutralise the acid. The removal of toluene was accomplished by means of heating and rigorous nitrogen sparge.

Example 1

A polyol mixture is prepared by mixing about 100 parts of polyether polyol having a molecular weight of 5000 and a hydroxyl number of about 34, with about 2.8 parts of water, further with about 0.5 parts of catalyst such as triethylene diamine and about 1 part of a siloxane surfactant as a stabiliser.

This blend was mixed, using a three stream moulding machine, together with about 35 parts of an isocyanate blend made from 80% toluene diisocyanate and 20% m-phenylene diisocyanate and 2 parts of a mixture made from 96% of butoxytriethylene glycol and 4% siloxane polyether block copolymer $(AB)_n$ type and about 150,000 to 200,000 M.W.

The butoxytriethylene glycol had a viscosity of 9 to 10 cSt at 25° C. and a surface tension of about 36 to 38 dynes/cm at 22° C. The blend of solvent and surfactant had a viscosity of 16.6 cSt and 25° C. and a surface tension of 27.5 dynes/cm at 21.7° C.

This complete mixture was poured into a closed mould made from cast aluminium and the moulded part demoulded after approximately 10 minutes.

After crushing, the resulting moulded foam part had a density of about 45 kg/m³.

TABLE 1

| Foam Characteristics | Test A | Example 1 |
|---|---|---|
| VC-agent | 0 php | 2.0 php |
| Hardness, N | | |
| (IFD, ASTM) | 250 | 290 |
| VC-factor, $Q_x$ | 3.8 | 2.7 |
| Breathability | | |
| Surface (Gurley) sec. | 2 | 4 |
| Core (NOPCO) SCFM | 3.5 | 0.7 |
| Cell size, mm | 0.2–2.0 | 1.5–3.5 |
| Cell volume, mm³ | 0.1–5 | 1.5–22 |
| No. of breaks in cell wall | 8–14 | 6–12 |
| Size of breaks in cell wall, mm | 0.1–1.3 | 0.1–0.8 |

TABLE 1-continued

| Foam Characteristics | Test A | Example 1 |
|---|---|---|
| Internal residue cell surface, % | 50–60 | 70–80 |

Test A

In a comparative test not according to the invention Example 1 was repeated but without the mixture of butoxytriethylene glycol and siloxane polyether block copolymer.

Example 2

A commercially available urethane pre-polymer system consisting of components A and B was mixed together in a three stream moulding machine together in a ratio 1:1 plus 2% of a mixture made from 96% of butoxytriethylene glycol and 4% siloxane polyether block copolymer, $(AB)_n$ type and about 150,000 to 200,000 M.W. The ready made mixture was poured into a closed mould as mentioned in Example 1.

The resulting moulded foam part had a density of about 45 kg/m³ after crushing

TABLE II

| Foam Characteristics | Test B | Example 2 |
|---|---|---|
| VC-agent | 0 php | 2.0 php |
| Hardness, N: | | |
| (IFD, ASTM) | 410 | 440 |
| VC-factor, $Q_x$ | 3.8 | 2.7 |
| Breathability: | | |
| Surface (Gurley), sec: | 4 | 5 |
| Core (NOPCO) SCFM: | 2.0 | 0.8 |
| Cell size, mm: | 0.2–2.0 | 0.6–3.5 |
| Cell volume, mm³ | 0.1–5 | 0.5–22 |
| No. of breaks in cell wall: | 8–14 | 6–10 |
| Size of breaks in cell wall, mm: | 0.1–0.8 | 0.1–0.6 |
| Internal residue cell surface, %: | 40–50 | 70–80 |

Test B

In a comparative test not according to the invention an experiment was carried out as in Example 2 but without the mixture of butoxytriethylene glycol and siloxane polyether block copolymer.

Example 3

A polyurethane foam was prepared in the manner described in Example 1. The foam employed was produced with the following ingredients:

| Ingredients | Parts by Weight | Stream |
|---|---|---|
| Polyol X | 100 | I |
| Water | 2.8 | I |
| Silicone surfactant | 1.0 | I |
| Triethylene diamine | 0.2 | I |
| Bis(2 dimethylaminoethyl)ether | 0.1 | I |
| Dibutyltindilaurate | 0.02 | I |
| Vibration Control Agent (96% Butoxytriethylene glycol) | 2.5 | II |
| (4% Siloxane polyether block copolymer, $(AB)_n$ type about 150,000 to 200,000 M.W. | | II |
| Toluene diisocyanate (80/20) | 29.9 | III |
| m-Phenylenediisocyanate | 7.5 | III |

Polyol X is an acrylonitrile/styrene grafted polyol with a molecular weight of about 5000 and a hydroxyl number of about 32.

The resulting moulded foam parts had a density of about 45 kg/m³ after crushing.

Test C

This is a comparative example not according to the invention. An experiment was carried out as in Example 3 but without using the vibration control agent.

TABLE III

| Foam Characteristics | Test C | Example 3 | | |
|---|---|---|---|---|
| VC-agent | 0 php | 1.5 php | 2.0 php | 2.5 php |
| Hardness, N: | | | | |
| (IFD, ASTM) | 450 | 450 | 460 | 480 |
| VC-factor, Qx | 3.9 | 3.1 | 3.0 | 2.2 |
| Breathability: | | | | |
| Surface (Gurley), sec: | 1 | 2 | 3 | 6 |
| Core (NOPCC), SCFM: | 4 | 0.6 | 0.5 | 0.2 |
| Cell size, mm: | 0.2–2.0 | 0.6–3.0 | 0.8–3.0 | 1–3.5 |
| Cell volume, mm³ | 0.1–5 | 0.2–15 | 2.0–18 | 4–23 |
| No. of breaks in cell wall: | 8–14 | 8–12 | 8–10 | 6–10 |
| Size of breaks in cell wall, mm: | 0.1–1.5 | 0.1–1.0 | 0.1–0.17 | 0.1–0.6 |
| Internal residue cell surface, % | 20–40 | 40–70 | 60–80 | 70–90 |

Example 4

A series of polyurethane foams were prepared in the manner described in Example 1. The foams employed were produced with the following ingredients varying the type of solvent in the Vibration Control Agent.

| Ingredients | Parts by Weight | Stream |
|---|---|---|
| Polyol X | 100 | ⎫ |
| Water | 2.6 | ⎬ |
| Silicone Surfactant | 0.8 | ⎭ I |
| Triethylene diamine | 0.33 | ⎫ |
| Bis(2-dimethylaminoethyl)ether | 0.15 | ⎬ |
| Vibration Control Agent (97% of varying Solvents (see Table IV) (3% of Siloxane block copolymers, (AB)$_n$ type and about 150,000 to 200,000 M.W.) | 2.0 | ⎭ II |
| Toluene diisocyanate 80-20 | 28.16 | ⎫ III |
| Crude Phenylenediisocyanate | 7.04 | |

Polyol X is an acrylonitrile/styrene grafted polyol with a molecular weight of about 5000 and a hydroxyl number of about 32.

The resulting moulded foam parts had a density of about 40 kg/m³ after crushing.

TABLE IV

| Type of Solvent | Surface Tension | Hardness ASTM 50%, N | VC-factor Qx | Breathability Core NOPCO/SCFM | Cell structure φ mm |
|---|---|---|---|---|---|
| Polypropylene glycol MW 1025 | — | 300 | 3.4 | 1.8 | 0.2 to 2.0 |
| Nonionic liquid Alcohol (with 3 Moles ethylene oxide) | — | 300 | 2.7 | 0.8 | 0.2 to 2.5 |
| Nonionic liquid Alcohol (with 9 Moles ethylene oxide) | 29 | 320 | 2.8 | 0.8 | 0.2 to 2.5 |
| Acetone | 23.7/20° C. | 370 | 2.2 | 0.6 | 0.4 to 3.0 |
| Methylethylketone | 23.5/20° C. | 350 | 3.0 | 0.8 | 0.3 to 3.0 |
| Xylene | — | 340 | 2.8 | 0.8 | 0.3 to 3.0 |
| Methylenechloride | — | 330 | 1.6 | 0.8 | 0.4 to 3.5 |
| Fluorocarbon-11 | — | 300 | 2.0 | 1.1 | 0.5 to 3.5 |
| Ethylalcohol | 22.7/20° C. | 230 | 2.2 | 0.9 | 0.3 to 3.0 |
| Butylalcohol | 22.4/20° C. | 250 | 2.2 | 0.8 | 0.3 to 3.0 |
| Methoxyethylacetate | — | 350 | 2.0 | 0.8 | 0.2 to 2.5 |
| Alkylsulphonic acid ester of phenol/cresol | — | 310 | 3.0 | 1.2 | 0.2 to 2.5 |
| Dimethylformamide | — | 340 | 2.1 | 0.8 | 0.3 to 3.0 |
| Polyether polyol 5000 MW | — | 340 | 2.2 | 1.0 | 0.3 to 3.0 |
| Polyether polyol 3500 MW | — | 360 | 1.8 | 0.6 | 0.3 to 3.0 |

Example 5

A cured polyurethane foam was prepared using a commercial low pressure moulding machine for making HR (high resilience) polyurethane foam at a throughput of about 14 kg/min. The machine used was sold under the Trade Name ADMIRAL.

The ingredients used were:

| | Parts by Weight |
|---|---|
| Polyol X | 100 |
| Water | 2.6 |
| Silicone surfactant | 0.8 |
| Triethylene diamine | 0.33 |
| Bis(2 dimethylamino)ether | 0.15 |
| Dibutytindilaurate | 0.005 |
| Vibration Control Agent (96% Butoxytriethylene glycol (4% Siloxane polyether block copolymer, (AB)$_n$ type and 150,000 to 200,000 M.W. | (See Table V) |
| Toluenediisocyanate | 28.16 |
| m-phenylenediisocyanate | 7.04 |

Several different samples of foam were prepared with dimensions 40×40×10 cm. The moulded foams were crushed and the properties of the foams measured. The results are given in Table V.

Test D

This is a comparative test not according to the invention.

Foams were prepared as in Example 5 but without the use of vibration control agent.

The results obtained are shown in Table V.

TABLE V

| Foam Characteristics | | | | | | | | | |
|---|---|---|---|---|---|---|---|---|---|
| Vibration control agents (parts by weight) | 0 | 0 | 0 | 1 | 1 | 1 | 1 | 1 | 1 |

TABLE V-continued

| Foam Characteristics | | | | | | | | | |
|---|---|---|---|---|---|---|---|---|---|
| Overall density kg/cm³ | 46.6 | 50.9 | 39.4 | 49.6 | 41.1 | 50.1 | 41.4 | 41.6 | 40.6 |
| Hardness (IFD, ASTM, 50%), N | 300 | 356 | 189 | 296 | 203 | 232 | 222 | 213 | 217 |
| VC-Factor Qx | 4.3 | 4.4 | 4.1 | 3.1 | 3.2 | 3.2 | 3.4 | 3.2 | 3.6 |
| Breathability Surface (Gurley), sec | 1.0 | 2.0 | 1.0 | 2.0 | 2.0 | 3.0 | 3.0 | 3.0 | 2.0 |
| Breathability Core (NOPCO), SCFM | 3.5 | 4.0 | 5.0 | 3.0 | 3.5 | 3.0 | 3.5 | 4.0 | 3.5 |
| Cell Size: mm | 0.2-2.0 | → | → | 0.2-2.0 | → | → | → | → | → |
| No. of breaks in cell wall | 8-12 | → | → | 8-12 | → | → | → | → | → |
| Internal residue cell surface % | 40 to 60 | → | → | 60 to 70 | → | → | → | → | → |
| Vibration control agents (parts by weight) | 1.5 | 1.5 | 1.5 | 2.0 | 2.0 | 2.0 | 2.0 | 2.5 | 2.5 | 2.5 |
| Overall density kg/m³ | 50.8 | 42.7 | 51.2 | 50.2 | 40.4 | 41.1 | 43.7 | 50.7 | 42.2 | 50.0 |
| Hardness, (IFD, ASTM, 50%), N | 352 | 233 | 362 | 348 | 203 | 210 | 246 | 353 | 230 | 360 |
| VC-Factor Qx | 3.0 | 2.9 | 3.3 | 3.2 | 2.8 | 2.9 | 3.0 | 2.6 | 2.3 | 2.2 |
| Breatability: Surface (Gurley), sec | 4.0 | 3.0 | 4.0 | 5.0 | 4.0 | 4.0 | 4.0 | 5.0 | 4.0 | 5.0 |
| Breatability: Core (NOPCO), SCFM | 1.5 | 2.0 | 1.5 | 0.9 | 1.0 | 0.7 | 1.1 | 0.7 | 0.6 | 0.5 |
| Cell Size: mm | 0.2-2.5 | → | → | 0.2-2.5 | → | → | → | 0.2-3.5 | → | → |
| No. of breaks in cell wall | 6-12 | → | → | 6-12 | → | → | → | 6-10 | → | → |
| Internal residue cell surface, % | 65 to 75 | → | → | 70 to 85 | → | → | → | 80 to 90 | → | → |

In the Examples the samples used to determine foam properties were taken from the core of the foam as is usual for this type of measurement.

The values quoted for cell size and internal residual cell surface were determined by observations of a sample of individual cells (usually about 20-25). The maximum and minimum cell size and residual cell surface were recorded.

The butoxytriethylene glycol used in the experiments in this specification was the mono ether.

In the experiments described above values are quoted for certain properties of the foam cells. These were determined by observation of samples of foam under the microscope. The diameter, residual cell surface, etc., were determined for a sample of about 20-25 cells and the highest and lowest values observed were recorded. The nature of the foams produced in the experiments is shown in the accompanying drawings which are photomicrographs at 20 times magnification.

Figure 1:
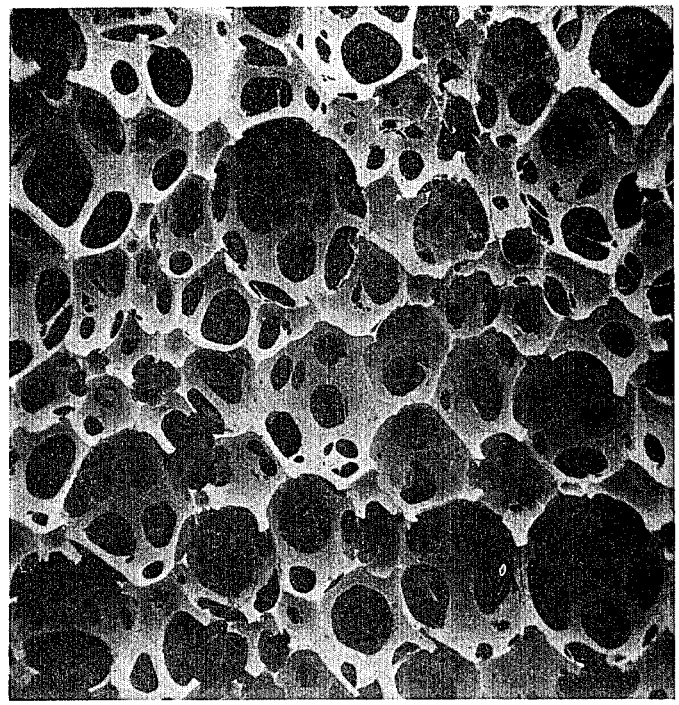
FIG. 1 is a photomicrograph of a sample of the foam produced in Test A.
Figure 2:
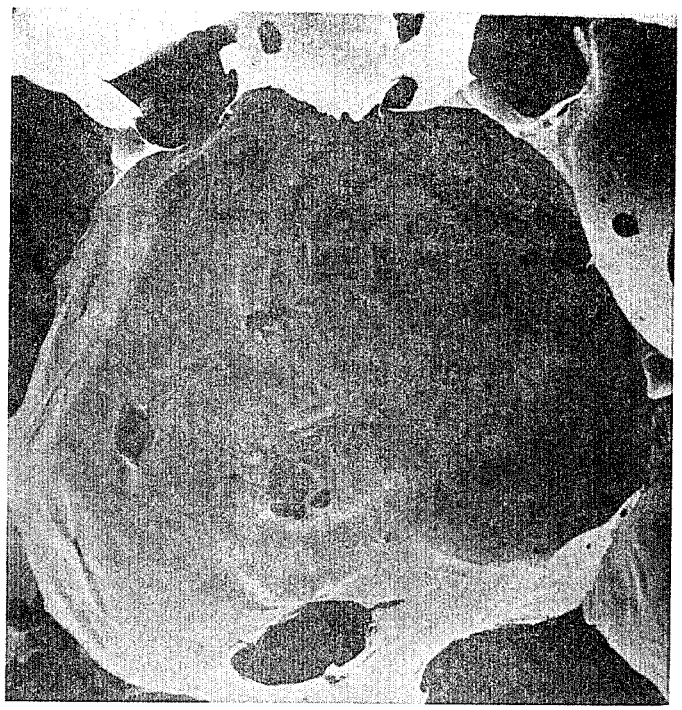
FIG. 2 is a photomicrograph of a sample of the foam produced in Example 1.
Figure 3:
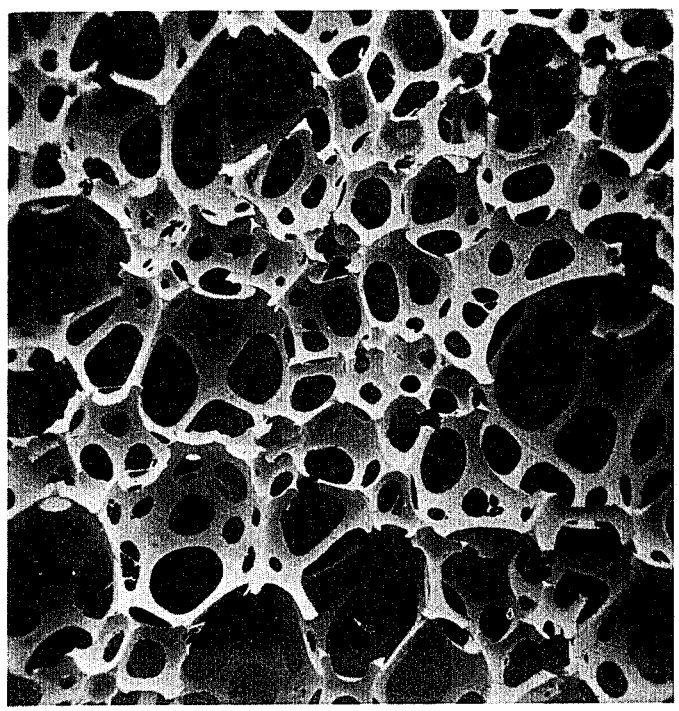
FIG. 3 is a photomicrograph of a sample of foam made in Test B.
Figure 4:
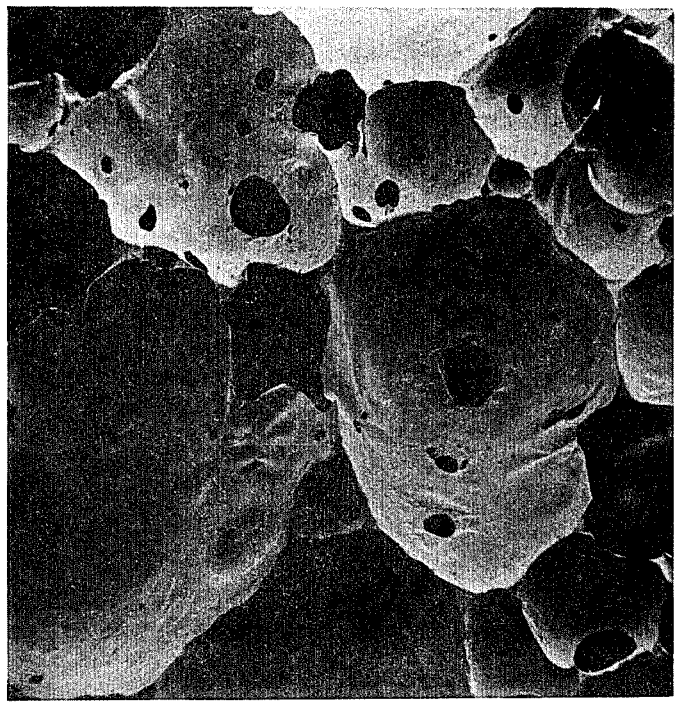
FIG. 4 is a photomicrograph of a sample of foam made in Experiment 2.
Figure 5:
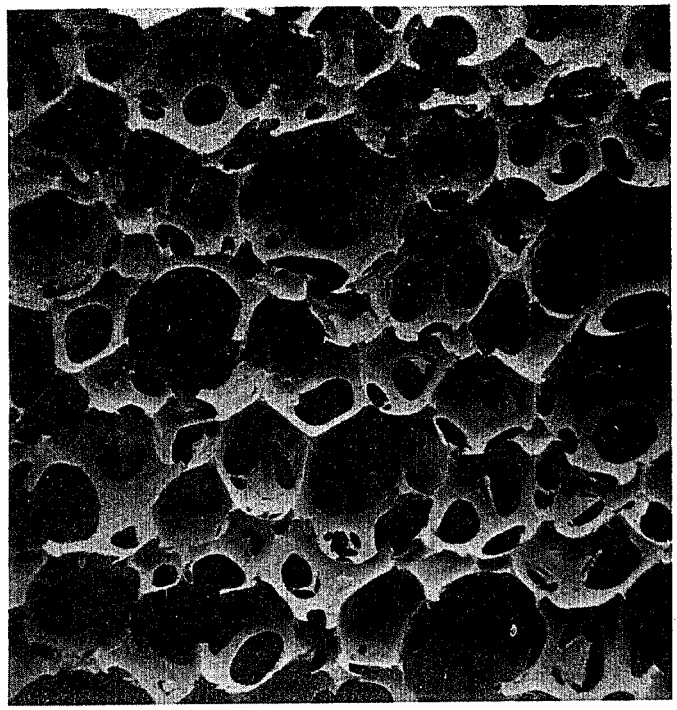
FIG. 5 is a photomicrograph of a foam made in Test C.
Figure 6:
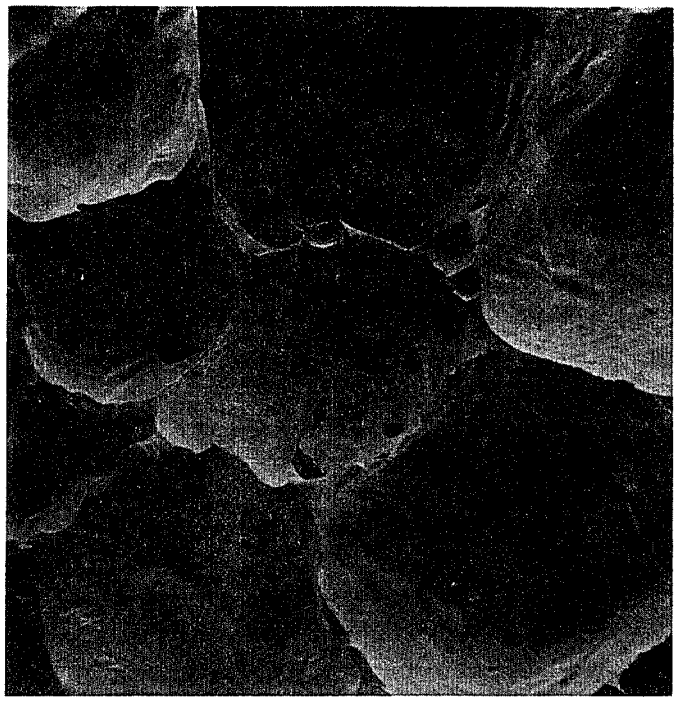
FIG. 6 is a photomicrograph of a foam made in Experiment 3.

These microphotographs show that the foam of the present invention differs in important respects from the prior art foams.

An alternative way of expressing the distribution of cell sizes to the method used in Examples 1 to 3 is to count the percentage of total numbers of cells in the ranges 0.2-1 mm, 1-2 mm, and 2-3.5 mm. The results for Examples 1 to 3 together with the results for a typical known high-resilience (HR) foam are set out below.

| | 0.2-1 mm | 1-2 mm | 2-3.5 mm |
|---|---|---|---|
| HR foam | 80% | 20% | — |
| Example 1 | 20% | 40% | 40% |
| Example 2 | 30% | 50% | 20% |
| Example 3 | 20% | 50% | 30% |

I claim:

1. A flexible polyurethane foam which has at least 50% of the cells with an internal residual cell surface greater than 60% and less than 90%.

2. A flexible polyurethane foam according to claim 1 wherein substantially all the cells have an internal residual cell surface greater than 60% and less than 90%.

3. A flexible polyurethane foam according to claim 1 wherein at least 50% of the cells have an internal residual cell surface greater than 70% and less than 90%.

4. A flexible polyurethane foam according to claim 1 wherein the breathability is not more than 2 SCFM.

5. A flexible polyurethane foam according to claim 4 wherein the surface breathability measured by the Gurley test is not less than 2 seconds.

6. A flexible polyurethane foam according to claim 5 wherein the surface breathability is not more than 20 seconds.

7. A flexible polyurethane foam according to claim 6 wherein the hardness as measured by the IFD ASTM test is at least 100 N.

* * * * *